United States Patent Office 3,260,130
Patented July 12, 1966

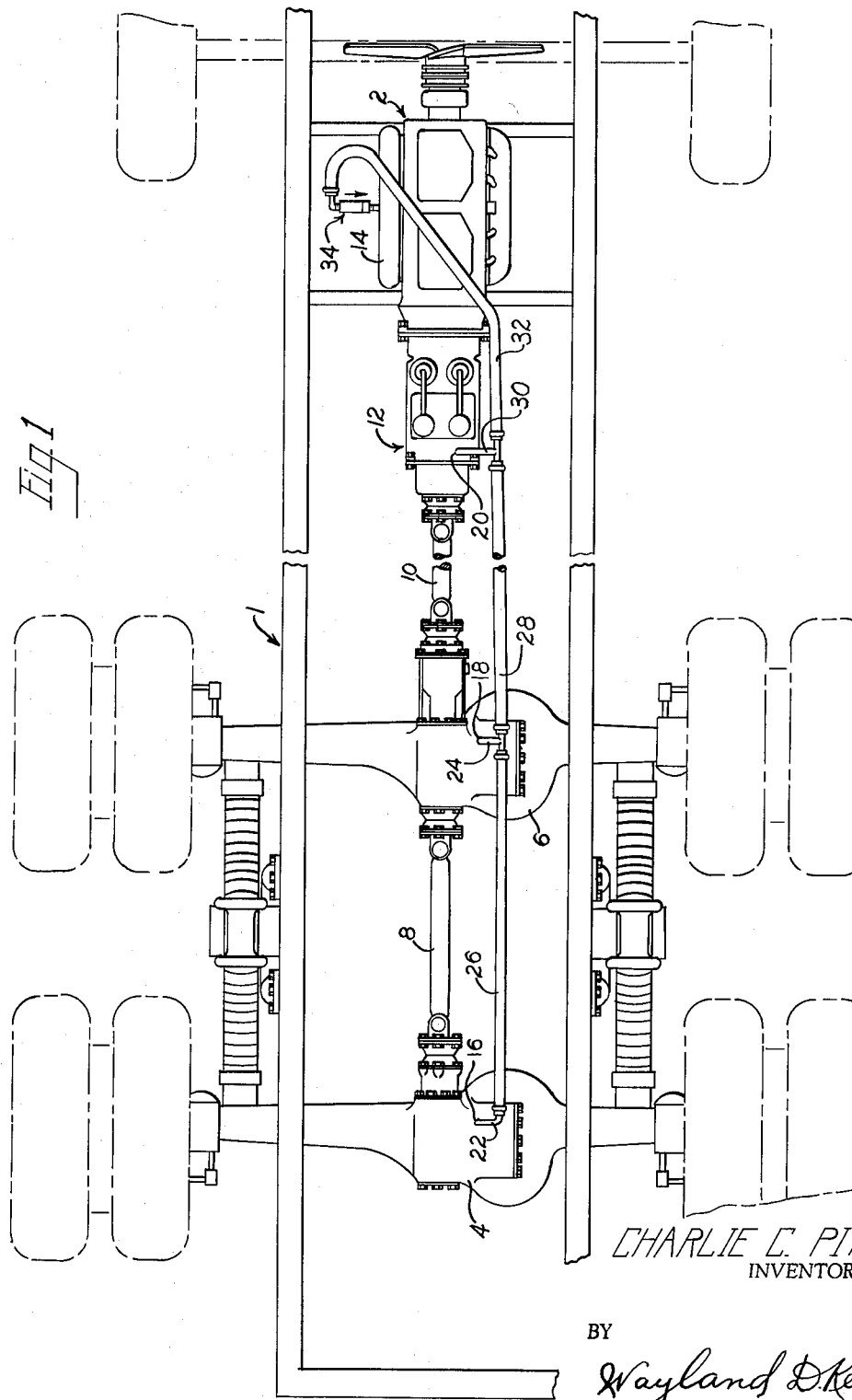

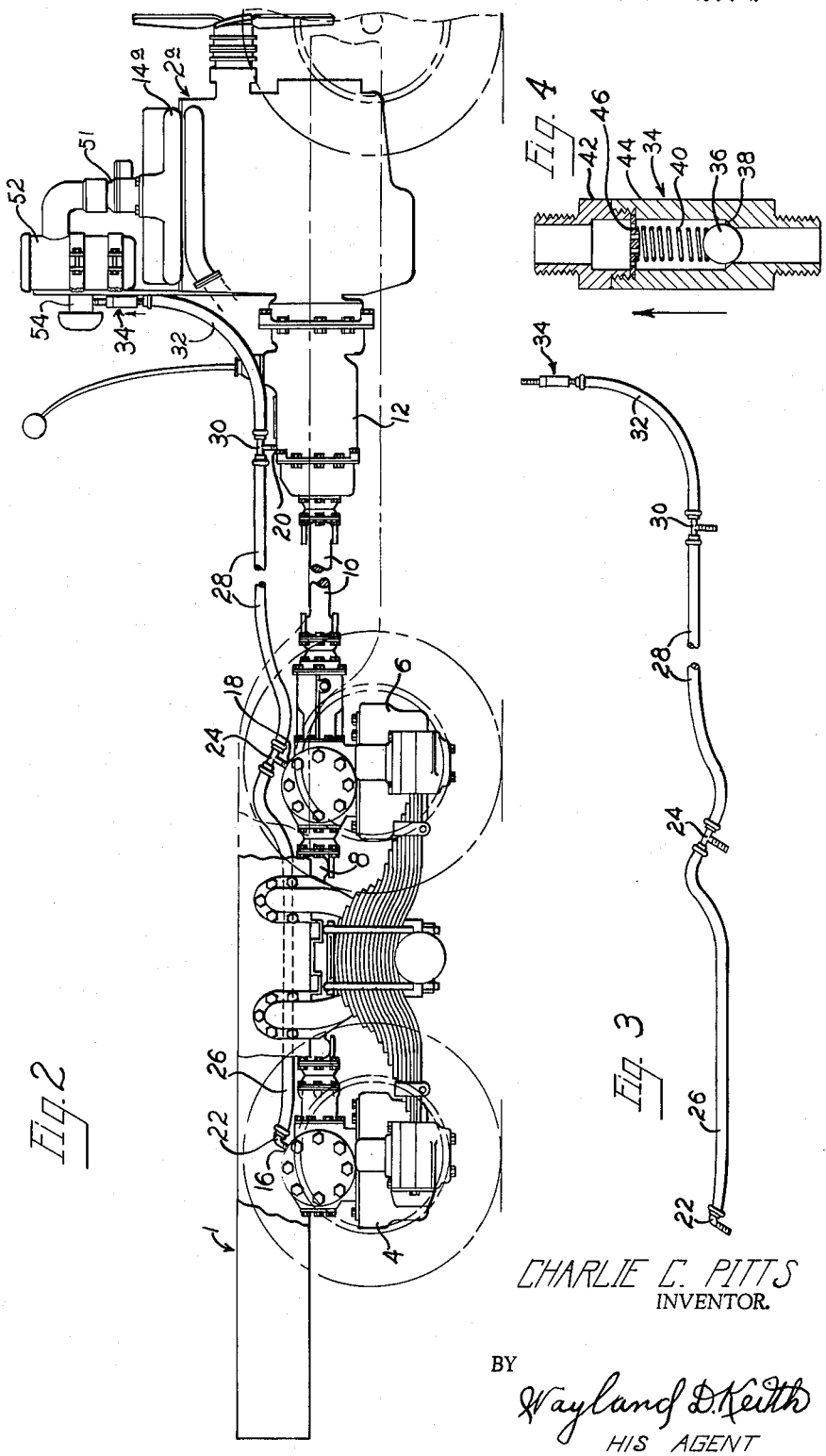

3,260,130
VENTILATION SYSTEM FOR GEAR HOUSINGS
Charlie C. Pitts, P.O. Box 2485, Wichita Falls, Tex.
Filed July 29, 1963, Ser. No. 298,027
4 Claims. (Cl. 74—606)

This invention relates to improvements in ventilating systems for gear housings, and more particularly to ventilating systems for venting gas vapors, by suction, from differentials and transmissions of motor vehicles, such as motor trucks used in contaminated atmosphere, such as road dust, conrete dust, sand and other substances which contaminate the lubricants in these mechanisms, or direct abrasives thereinto, which would cause wear to the gears, bearings, and the like.

The conventional manner of ventilating transmissions, differentials and gear housings, in general use, is a breather pipe which permits air and gases to flow outward therethrough when the oil becomes heated, and to permit air to be drawn thereinto when the oil within the respective mechanisms become cooled.

In certain types of mechanisms, the pulsation within the mechanism causes a periodic breathing or expelling of gases and the intake of air regularly, which breathing causes the oil to become contaminated with dust, abrasives, and foreign matter, and the gears to become worn because of the foreign matter and abrasives which are drawn thereinto.

The present invention is so designed as to maintain a slight suction on the housings of the differentials and the transmission to prevent the ingress of contaminated air thereinto.

An object of this invention is to provide a breather system for gear mechanisms, such as differentials, transmissions, and the like, which are used in conjunction with internal combustion engines and trucks, so as to prevent entrance of foreign matter into these mechanisms.

Another object of the invention is to provide a ventilation system which withdraws the gases from the differential housings and from the transmission housing and directs these gases into the intake of an internal combustion engine.

Still another object of the invention is to provide a ventilation system for differential housings and the housings of transmissions in motor trucks and the like which use internal combustion engines, which system will withdraw the heated gases from the housings of differentials and transmissions to maintain these units at a lower temperature.

A still further object of the invention is to provide a ventilation system for the housings of differentials and transmissions for trucks using internal combustion engines which is simple in construction, low in the cost of manufacture, easy to install, and which is effective in use.

Another object of the invention is to provide a suction on the breather system of the housings of differentials and transmissions of motor vehicles which will prevent the build-up of pressure within these housings, thereby preventing oil seals around shafts, such as axles and pinion shafts from being blown out.

With these objects in mind and others which will become manifest as the description proceeds, reference is to be had to the acompanying drawings in which like reference characters designate like parts in the several views thereof, in which:

FIG. 1 is a top plan view of the chassis and power train mechanism of a tandem truck which uses two differentials and a transmission, and which utilizes an internal combustion engine of the diesel type to power the truck, with parts being broken away, and with parts being shortened, the non-analogous mechanism being deleted to show the ventilating system connected to the differentials and to the transmission of the truck and to the intake manifold of the diesel type internal combustion engine;

FIG. 2 is a side elevational view of a truck chassis, similar to that shown in FIG. 1, and with the ventilation system connected to the tandem differential housings and to the housing of the transmission and to the air inlet of an air cleaner on an internal combustion engine of the gasoline type, with parts being shown shortened and with parts broken away to simplify the showing of the invention;

FIG. 3 is a side elevational view of the pipe connections and the hose connections, together with the check valve which go to make up the ventilation connections, with parts broken away and shortened; and FIG. 4 is a longitudinal view through a check value used within the system intermediate the internal combustion engine and the housings of the gear mechanisms so as to prevent gas flowing downward from the manifold into the housings of the transmission and the housings of the differentials.

With more detailed reference to the drawing, the numeral 1 designates generally a truck chassis having an internal combustion engine, generally designated by the numeral 2 therein. The truck is shown to have differentials 4 and 6 connected in tandem relation by a drive shaft 8, with a drive shaft 10 being connected to differential 6, which shaft 10 extends to and is connected to transmission 12. The transmission 12 is connected in driven relation with the internal combustion engine 2. The form of the internal combustion engine, as shown in FIG. 1, is of the diesel type and has an inlet manifold 14 for distribution of the air to the cylinders of the engine 2.

The differentials 4 and 6 each has a housing, each of which housings has a breather pipe outlet hole therein, designated at 16 and 18, respectively, to permit the egress of hot gases therefrom, and normally, a breather cap is connected thereto which permits ingress of air thereinto, whether pure or dust laden. Some breather caps have a small filter therein which removes some of the foreign matter from the air which passes into the differential and transmission housing, when there is relatively little contamination in the air. However, in an atmosphere heavily laden with dust particles and abrasives, these particles are often sucked into the differential housings, which causes the oil therein to become quickly contaminated and the gears and bearings to become more rapidly worn. This is also true with the breather cap that is normally on the transmission housing of trucks, heavy road machinery and the like. The housing of transmission 12 has a breather pipe outlet hole 20 therein which normally receives a breather cap connection in a manner similar to that set out for the housings of the differentials 4 and 6.

The present invention utilizes a pipe L 22 and a pipe T 24 which are connected with the respective breather outlet holes 16 and 18 in the respective differential housings 4 and 6, through which pipe fittings air, oil fumes and hot gases are withdrawn from the housings of the differentials 4 and 6. The pipe L 22 connects with a flexible conduit, such as a hose 26. The other end of the hose 26 is connected to pipe T 24. A hose 28 leads from the other branch of the pipe T 24 and connects to a branch of pipe T 30. The pipe T 30 is connected to breather pipe opening 20 in the housing of the transmisison 12 so that gases will flow outward through pipe 30 and into hose 32 from the housing of transmisison 12.

The gases from the housings of the differentials 4 and 6, and from the housing of transmission 12 are directed through hose 32 into and through a check valve 34, which is connected between hose 32 and intake manifold 14, in the form of the invention shown in FIG. 1.

The check valve 34 is of the character which will permit the flow of fluids therethrough by a ball check 36 in one direction, which ball check is held on seat 38 of valve 34 by a relatively weak spring 40, but which spring 40 is of sufficient strength to overcome the weight of gravity, which will enable the check valve 34 to readily work in any position. The check valve 34 has an outlet formed in cap 42 thereof, which cap threadably engages valve body 44 to retain a perforate disc 46 in fixed relation within the valve body 44, which perforate disc permits fluid to flow therethrough.

The check valve 34, having a ball check 36 therein, prevents pressure being exerted on the seals around the shafts in the housings of differentials and in the housing of the transmission of a motor vehicle, in event the engine of the vehicle should backfire.

*Operation*

When the internal combustion engine 2 is running, a slight suction will be developed on manifold 14, and since the outlet in cap 42 of check valve 34 is threadably connected into mainfold 14, oil vapors, hot gases, and the like will be withdrawn from the housing of differential 4 through pipe L 22 into hose 26 and thence the vapors from the housing of differential 6 will be withdrawn through a branch of pipe T 24 and the gaseous substance will be withdrawn from pipe T 24 by hose 28 into the pipe T 30, whereupon, the suction on manifold 14 will withdraw gases from the housing of transmisison 12 through pipe T 30 into hose 32 to combine with the gases which are withdrawn from hose 28. These gases will be drawn into the manifold 14 through check valve 34, with the ball check compressing spring 40. The oil vapors withdrawn from the housings of these gear mechanisms will serve to lubricate the upper portions of the cylinders within internal combustion engine 2, so as to increase the efficiency thereof. At the same time, foreign matter is prevented from entering the housings of the respective differentials 4 and 6 and from entering the housing of transmision 12.

The suction by the intake of the engine is so slight that the normal vapors due to expansion or to the operation of the mechanisms therein is directed to the intake manifold, but the suction is not sufficient to withdraw the oil from the respective housings.

*Second form of the invention*

The second form of the invention is shown in FIG. 2, and is identical with the first form of the invention, with the exception that, the form of the invention shown in FIG. 2 utilizes an internal combustion engine 2a of the gasoline type, and which engine has an intake manifold 14a, which manifold is distinguished from the manifold 14, in the form of the invention shown in FIG. 1, in that a carburetor 51 is shown attached to the manifold 14a and an air cleaner 52 is shown as being attached to the intake side of the carburetor 51. The air cleaner 52 has an air inlet 54 which draws the air into the cleaner 52 by the suction of the manifold 14a, which is connected thereto through carburetor 51. The check valve 34 is shown to be installed in fluid communication with the air inlet 54 of air cleaner 52. In this manner, the vapors are withdrawn from the housings of the respective differentials 4 and 6 and from the housing of transmisison 12 to maintain the differentials and the transmission free of contamination in the same manner as set out for the form of the invention, as shown in FIG. 1.

While both forms of the invention have been directed more specifically to motor vehicles of the character of a truck, it is to be understood that these devices are equally applicable to earth moving machinery, such as scrapers, graders, maintainers, cranes, and the like; as the primary intent of the invention is to maintain a suction on the respective gear housings in such manner as to prevent entrance of foreign matter thereto.

Having thus clearly shown and described the invention, what is claimed as new and desired to be secured by Letters Patent is:

1. A ventilation system for a differential housing of an internal combusion engine powered vehicle, which system comprises;
   (a) an air cleaner connected in fluid communication with the internal combustion engine of the vehicle,
   (b) a vent conduit connected in fluid communication between the differential housing of said vehicle and the air cleaner.

2. A ventilation system for a differential housing of a vehicle, which vehicle has an internal combustion engine connected thereto, which internal combustion engine has an air cleaner connected therewith, which system comprises;
   (a) a vent conduit system connected in fluid venting relation with the differential housing and being in fluid communication with the air cleaner connected to the suction side of the intake manifold of the internal combustion engine of the vehicle.

3. A ventilation system for a plurality of differential housings and a transmission housing of a motor vehicle having an internal combustion engine therein, which engine has an intake manifold thereon, which system comprises;
   (a) a first vent conduit connecting the housings of the differentials in fluid communication,
   (b) a second vent conduit connecting the housings of the differentials and the housing of the transmission in fluid communication, and
   (c) a third vent conduit connecting the housings in fluid communication with the suction side of the intake manifold of the internal combustion engine.

4. A ventilation system for a differential housing of an internal combustion engine powered vehicle, which system comprises;
   (a) an air cleaner mounted on the vehicle remote from the differential housing,
   (b) a vent conduit connected in fluid communication between the differential housing of the vehicle and the air cleaner mounted on the vehicle.

References Cited by the Examiner

UNITED STATES PATENTS

| | | | |
|---|---|---|---|
| 2,019,026 | 10/1935 | Spear et al. | 74—606 |
| 2,829,629 | 4/1958 | Badertscher et al. | 123—119 |
| 3,167,060 | 1/1965 | Fowler et al. | 123—119 |

MILTON KAUFMAN, *Primary Examiner.*

BROUGHTON G. DURHAM, *Examiner.*

W. S. RATLIFF, *Assistant Examiner.*